United States Patent [19]

Chiodo

[11] Patent Number: 4,540,258
[45] Date of Patent: Sep. 10, 1985

[54] APPARATUS FOR PHOTOGRAPHING BODY CAVITIES

[75] Inventor: Rudolph J. Chiodo, West Hempstead, N.Y.

[73] Assignee: Dimedco, New Rochelle, N.Y.

[21] Appl. No.: 460,832

[22] Filed: Jan. 25, 1983

[51] Int. Cl.³ .................. G03B 15/00; G03B 29/00
[52] U.S. Cl. ........................................................ 354/62
[58] Field of Search ............... 128/4, 6, 7, 8, 9, 908; 354/62, 63, 135, 145.1

[56] References Cited

U.S. PATENT DOCUMENTS

| | | |
|---|---|---|
| 1,828,141 | 10/1931 | Back . |
| 2,349,932 | 5/1944 | Back . |
| 2,516,132 | 7/1950 | Marcouiller ........................ 354/62 |
| 2,601,406 | 6/1952 | Marcouiller ........................ 354/62 |
| 3,329,074 | 7/1967 | Gosselin ............................ 354/62 |
| 3,559,550 | 2/1971 | Back ............................. 354/62 X |
| 3,726,272 | 4/1973 | Fukami et al. ................. 354/62 X |

Primary Examiner—John Gonzales
Attorney, Agent, or Firm—Fitzpatrick, Cella, Harper & Scinto

[57] ABSTRACT

An improved apparatus for photographing body cavities having an apparatus for photographing cavities of the body having a pair of tubular cameras, each containing a film-holding spider; a lighting element intermediate said cameras having a filament producing a glow discharge upon application of current; a tubular shutter slidably enclosing said cameras; means to move said cameras axially of said tubular shutter to permit exposure of said film in said spiders; and means to supply air to said apparatus and to expel air into a body cavity, the improvement comprising means to supply a safe level of current to said lighting element.

4 Claims, 6 Drawing Figures

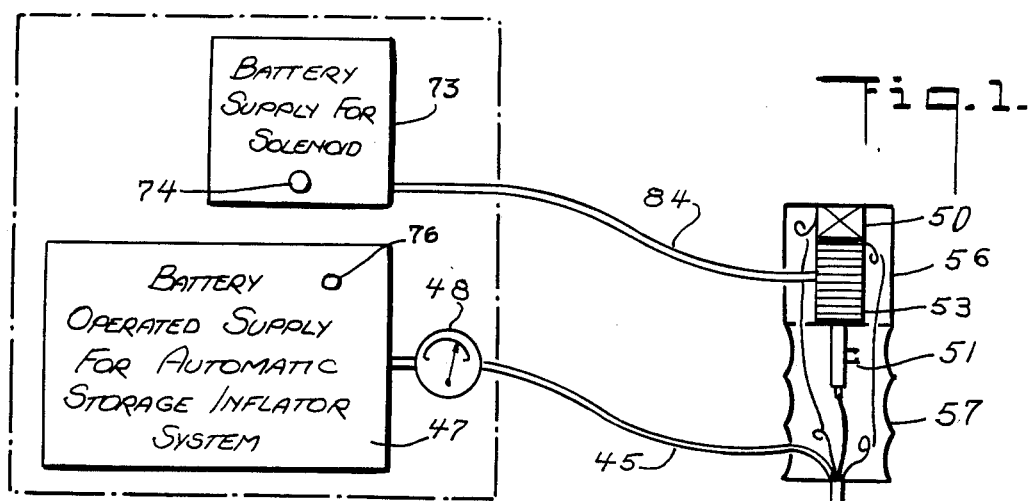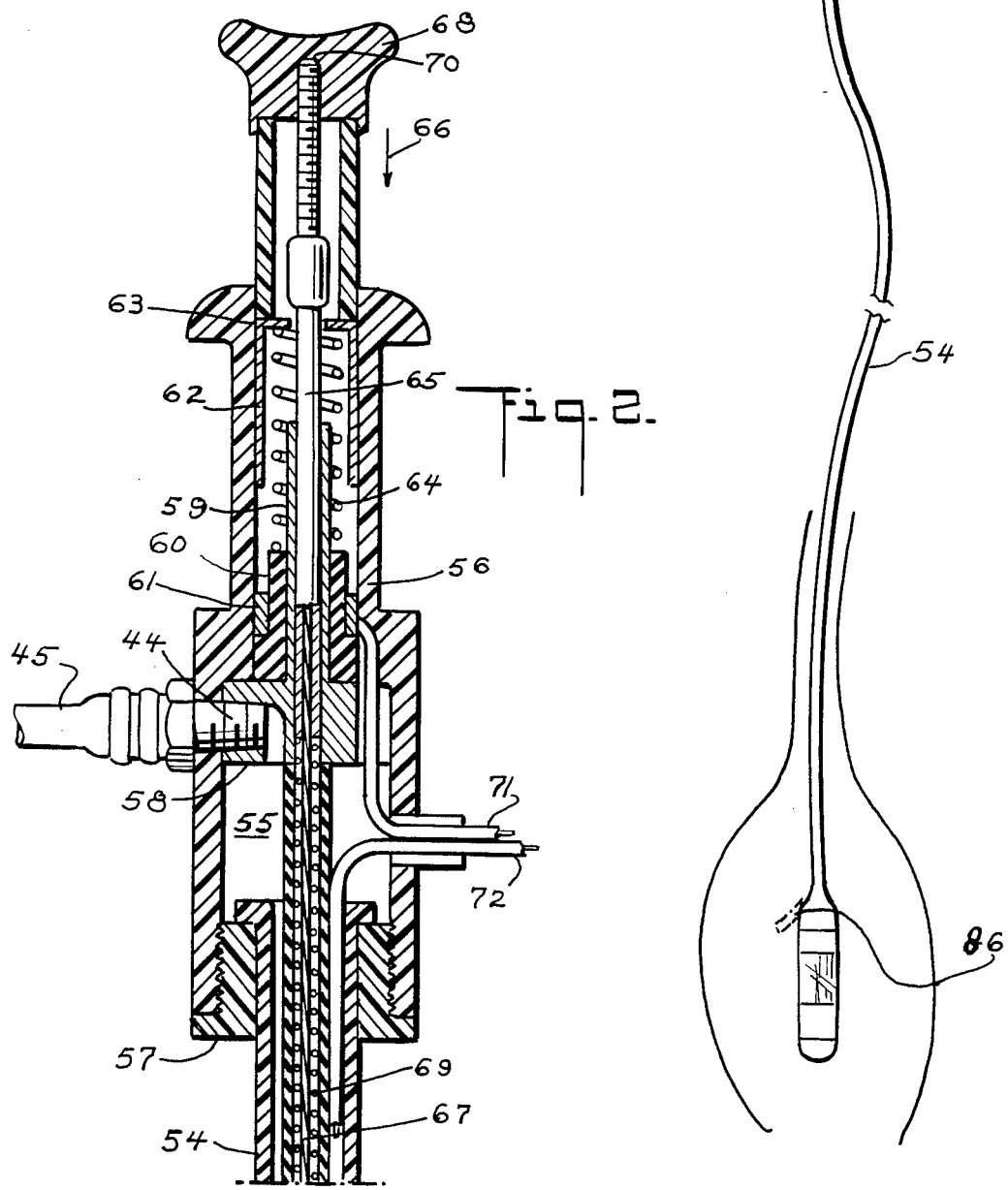

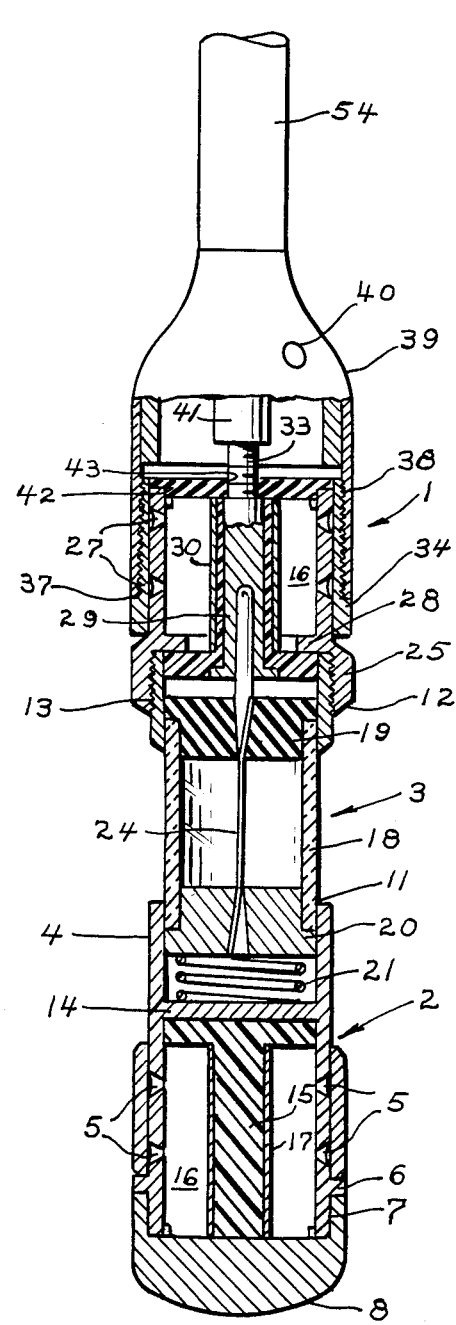
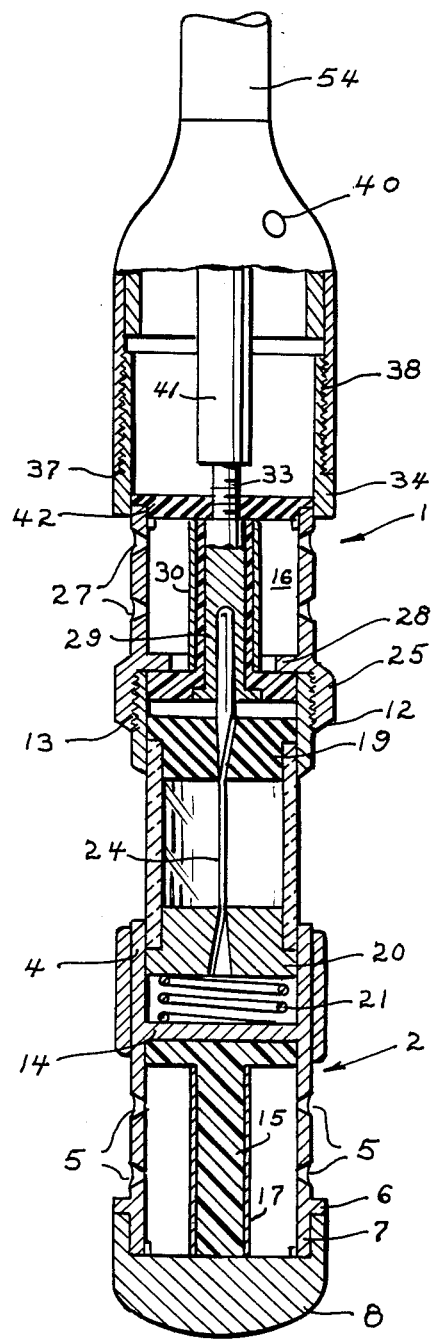

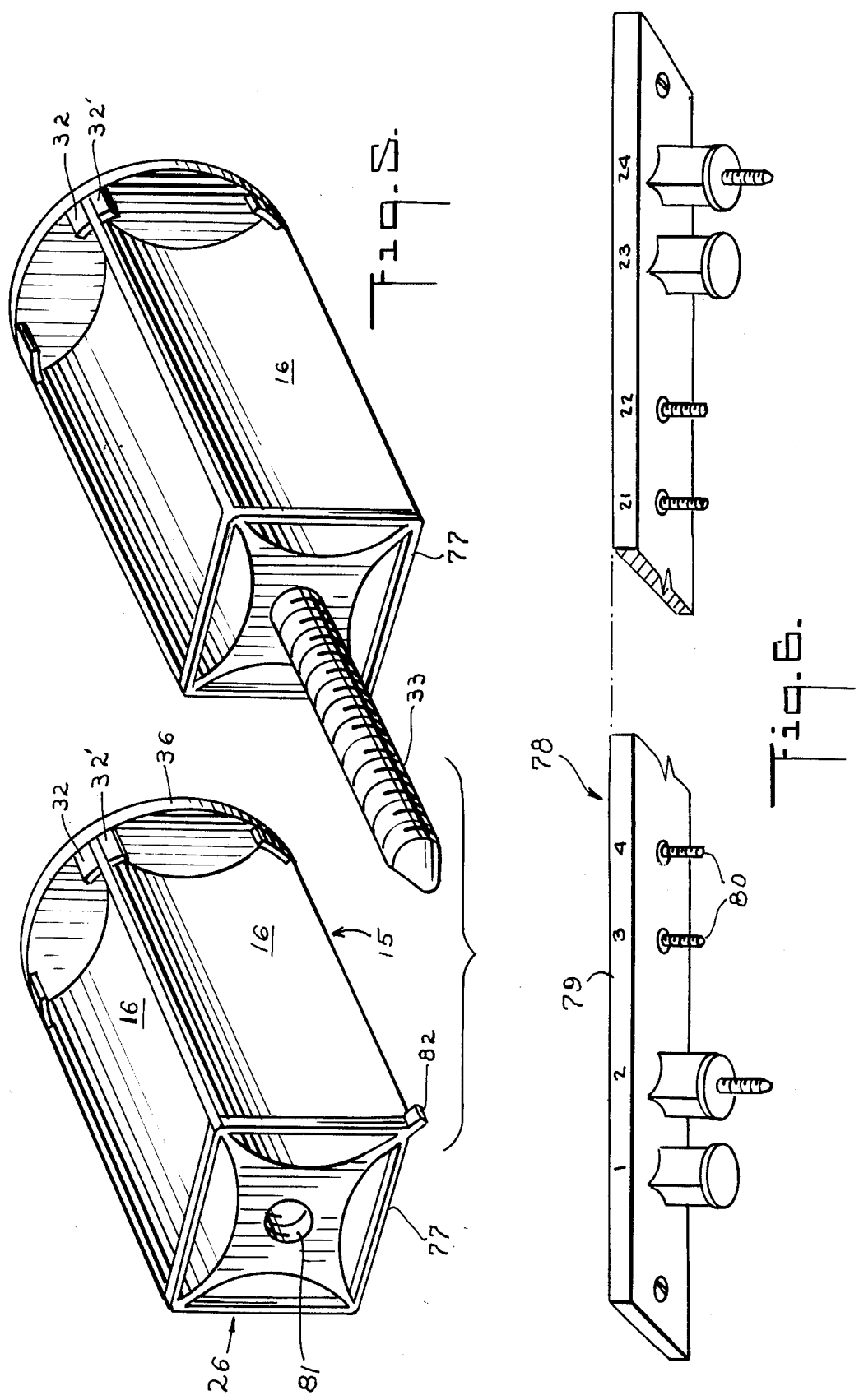

APPARATUS FOR PHOTOGRAPHING BODY CAVITIES

BACKGROUND OF THE INVENTION

1. Field of the Invention

The present invention relates to an improved apparatus for taking photographs of cavities of the body. More specifically, it relates to an improved gastric camera for safely and efficiently photographing the gastric cavity and for developing said photographs.

It has long been desired to obtain clear and highly defined photographs of body cavities utilizing equipment which can be safely and efficiently employed by those such as physicians or surgeons who may be unskilled in the art of photography. In particular, it has proven difficult to obtain sharp pictures of such internal cavities as the stomach while operating under the vigorous sanitary and safety constraints of a modern operating room or theatre.

2. Description of the Prior Art

Devices for photographing body cavities and the like have been proposed in U.S. Pat. No. 1,828,141 and No. 2,349,932, the disclosures of which are expressly incorporated herein by reference. Such devices utilize a camera with a dedicated flash or light source which is carried at the end of a flexible tube or catheter. The flash unit has generally been plugged into a wall socket through an appropriate transformer and switch. This assembly has been deemed unsafe for modern operating rooms, in view of the danger of sparking with a possible resulting explosion of flammable oxygen or anaesthesia gas and the threat of introducing unsafe current levels into the body cavity which surges can cause shock or even electrocution. Such problems were engendered by the need for producing intense illumination required, in part, for the relatively slow film previously available.

In addition, the film carriers or spiders for such cameras were individually loaded with film strips in a darkroom and the film-carrying spiders were immediately inserted into the camera assembly to prevent the film strips from becoming dislodged or lost. Thereafter, the entire camera unit had to be sterilized. After exposure, the film strips had to be individually unloaded from their retaining spiders in a darkroom and separately developed. This was a laborious and inefficient procedure. The film strips are very small, difficult to handle and easily misplaced.

Operation of such gastric cameras was unduly time consuming and difficult. The body cavity to be photographed would be distended by introduction of air to obtain a clear image. This procedure previously required use of a control bulb and a press bulb as an air injector. Such bulbs can be dangerous, since they provide no indication of the degree to which the body cavity has been inflated.

In addition, after the body cavity had been properly distended, an actuating mechanism was manually operated to open the camera shutters and initiate the flash. If the manual air injection and camera operations were not closely coordinated, then the photographs were unsatisfactory. In addition, high current levels for the flash were unsafe both for the patient and for others nearby in the operating room.

SUMMARY OF THE INVENTION

Accordingly, it is a primary object of the present invention to provide an improved apparatus for photographing body cavities free of the defects and deficiencies of the prior art and adapted for safe, efficent use under rigorous sanitary conditions.

The above and other objects are met in an improved apparatus for photographing cavities of the body having a pair of tubular cameras each containing a film holding spider; a lighting element intermediate said cameras having a filament producing a glow discharge upon application of current; a tubular shutter slidably enclosing said cameras; means to move said cameras axially of said tubular shutter to permit exposure of film in said spiders and means to supply air to said apparatus and to expel air into a body cavity, wherein the improvement comprises means to supply a safe level of current to said lighting element.

In another embodiment an improved film retaining spider for said apparatus employs film restrainers to permit film-containing spiders to be readily sterilized prior to exposure and to permit the exposed film to be developed without its removal from the spider.

In yet another embodiment an automatic insufflator is provided to supply air to said body cavity and to detect the degree of inflation thereof.

In a further embodiment each spider is formed with an internally threaded hole for detachable mounting on a hanger having externally threaded posts.

BRIEF DESCRIPTION OF THE DRAWINGS

The novel features of the invention as well as other objects and advantages thereof, will be more fully understood from the following description of a preferred embodiment thereof, when read in conjunction with the accompanying drawings in which:

FIG. 1 is a schematic view illustrating the complete photographic apparatus during use;

FIG. 2 is a longitudinal cross-sectional view through the operating handle by which the camera is manipulated;

FIG. 3 is an elevational sectional view through the cameras, lighting device and shutter mechanism with the shutter in the closed position;

FIG. 4 is a sectional view similar to FIG. 3 with the shutter in the open position;

FIG. 5 is an enlarged perspective view of the upper and lower camera film holders; and FIG. 6 is a perspective view of a hanger for storing and processing film holders.

DESCRIPTION OF PREFERRED EMBODIMENTS

As illustrated in FIG. 1 my improved apparatus comprises an upper camera designated 1 and a lower camera designated 2 with a lighting device 3 arranged between them. The cameras 1 and 2 and the lighting device 3 are tubular in form and are axially aligned.

As shown in FIGS. 3 and 4, the lower camera 2 comprises a lower tubular member 4 being provided in the walls thereof with four sets of pinhole diaphragms 5. The lower end of camera 2 is shouldered at 6 and screwthreaded at 7 for the purpose of receiving a metallic hemispherical cap 8 which, when in place, abuts the underside of shoulder 6. The hemispherical shape of this cap facilitates the introduction into the cavity to be photographed of the unitary camera structure, i.e., the two cameras 1 and 2 and the lighting device 3 arranged between them.

The wall of tube 4 above the diaphragms 5 is cut away or cut out as shown at 11, to provide a skeleton structure extending longitudinally of the tube. The upper end of this skeleton structure is shouldered as shown at 12 and screw-threaded at 13.

The interior of the tube 4 is provided, a short distance below the part designated 11, with an internal transverse partition 14. Below and abutting this partition is a removable spider 15 of suitable insulating material, for instance, hard rubber or a polymer formed from a thermoplastic or thermosetting resin. The spider is provided with longitudinally extending curved faces 16, which are disposed at an angle of 90° with respect to each other. Each of these curved faces 16 is preferably equidistant from the inner end of the pin hole diaphragms 5, the specific curve thereof being selected to permit the inner ends of the diaphragms to be a center for the opposed face 16.

The spider 15 is provided for the purpose of receiving light sensitive members such as films 17. When it is desired to remove the films or light sensitive members 17 or to reload the camera, it is only necessary to unscrew the hemispherical cap 8 and remove or partially remove the spider 15. Rotation of spider 15 in tube 4 is prevented by square boss 82 which extends upwardly through a square hole in partition 14.

The light source or lighting means which, as a whole, is designated 3 is in the form of a tubular member having a glass wall 18 closed at each end by caps 19 and 20. Cap 19 is of suitable insulating material, cap 20 is metal. This tubular member passes into the upper end of the camera tube 4 and rests upon a contact spring 21 which in turn seats or rests upon the upper face of the internal partition 14.

The insulating cap member 19 is provided with an electrode 22 and cap 20 with a similar electrode 23. These electrodes are tapered and secure the ends of a filament 24 in place in caps 19 and 20. The filament is composed of a highly refractory material, preferably tungsten or another such metal or alloy, a carbon-based material or a composite material suitably selected to provide requisite light at safe current levels. The filament is jammed or clamped at each end between electrodes 22 and 23 and the caps 19 and 20, respectively.

The upper camera 1 comprises an upper tubular member 25 internally threaded so as to telescope and be threaded upon the threaded portion 13 of tube 4. The walls of the tube 25 are provided with four sets of pin hole apertures or diaphragms 27 similar to the pin hole diaphragms 5 in the lower camera. The lower end of tube 25 is provided with a transverse partition 28 and receives a removable spider 29 which is similar to the spider 15 in the lower camera. The head of spider 29 abuts against the underside of the partition 28, the body portion of the spider extending upwardly through the partition 28 and longitudinally of the tube 25. Spider 29 is also provided with curved surfaces similar to the surfaces or faces 16 in the lower spider 15 for receiving films 30.

At its lower end, spider 29 is molded about a short metallic tube 31; the upper end of the electrode 22 extends into this tube 31, as shown in FIGS. 3 and 4. The spider 29 is furthermore provided at its upper end with a screw threaded member 33 the purpose of which will be described in more detail hereinafter.

The exterior of my apparatus is provided with a shutter mechanism for the two cameras and also the necessary mechanism for shifting the cameras relative to the shutter. This shutter mechanism comprises a tube 34 surrounding both cameras and cut away intermediate its ends to provide a skeleton portion 35 which lies abreast of the skeleton structure of the tubular member 4. Tube 34 has a sliding fit on the camera tubes and when in the closed position with the diaphragms 5 covered or closed, as shown in FIG. 3, presents a smooth surface for the passage of the device into the cavity to be photographed. This prevents the entry of any foreign material into the diaphragms during the process of insertion of the device into the cavity. The smooth surface, as noted above, facilitates the insertion of the device and also prevents injury to the membrane of the cavity to be photographed. The upper end of the shutter tube is reduced in diameter to provide a shoulder 37 and is threaded externally as shown at 38. Upon this threaded portion 38 is screwed an open ended metal cap 39.

This cap 39 is permanently connected with the rubber tube 54 which connects the photographic cameras with the operating handle as shown in FIG. 2. This rubber tube 54 contains the shutter operating member which is usually a resilient wire 67 surrounded by a stiffening wire coil 69. This wire 67 is provided at its lower end reaching into cap 39 with an internally threaded tube 41. The screw threaded member 33 secured to spider 29 is threaded into this tube 41 connecting thereby the operating wire 67 with the unitary camera structure consisting of the cameras 1 and 2 and the lighting device 3.

In accordance with the present invention, the upper end of camera 1 is covered by a disc shaped cover 42 provided with a central screw-threaded opening 43. By means of this screw threaded opening 43, cover 42 is secured to the screw threaded member 33, thereby tightly closing the upper open end of camera 1 as shown in FIGS. 3 and 4.

Thus, it is possible without difficulty to detach the cameras and the shutter mechanism from the operating wire 67 and the rubber tube 54, respectively, without exposing to light the films arranged within camera 1. The cameras and the shutter mechanism are detached from wire 67 and rubber tube 54 respectively by simultaneously unscrewing the screw threaded member 33 from tube 41 and the screw threaded 38 portion (at the upper end of the shutter tube 34) from cap 39 respectively, without removing cover 42 from the upper end of camera 1.

The soft rubber or flexible polymeric tube 54, as will be seen from FIG. 1, is of substantial length and the upper end thereof is enclosed within a hard rubber or plastic housing 56. The housing 56 is provided at its lower end with an insulating cap 57 which encloses tube 54 as illustrated in FIG. 2.

The mechanism for operating the shutter and closing the electric circuit of the lighting device 3 is arranged within this housing 56. This operating mechanism as illustrated in FIG. 2 consists of the metallic member 58 provided with a tubular extension 59. Sleeve 60 made of insulating material is arranged around the tubular member 59 and a metallic ring shaped contact member 61 carried by sleeve 60 is thus electrically insulated from the metallic tubular member 59. Another metallic tubular member 62 serves as a second contact means. This member is closed at its top 63 and forced away from contact ring 61 by means of the helical spring 64.

Furthermore, an inner tube 65 is arranged within the tubular extension 59 and the tubular contact member 62, as shown in FIG. 2. The upper part of this inner tube 65 is thicker than its lower part and abuts against the closed top 63 of the tubular contact member 62, thereby pressing this tubular contact member 62 against contact ring 61 if moved downward in direction of arrow 66.

The top portion of the inner tube 65 is also provided with an external thread and knob 68 is screwed thereto. The operating wire 67 reaches into the hole 69 in knob 68 to the top wall 70 thereof. Thus, by exerting pressure against knob 68 in direction of arrow 66, it is possible to simultaneously move the operating wire 67 downward in direction of arrow 66 and to force the tubular contact member 62 into contact with the ring shaped contact member 61. This latter member 61, is connected by wire 71 with the electric circuit of lighting device 3. This electric circuit is also connected directly with the lower electrode 23 of the device 3 by wire 72 which passes through rubber tube 54. In view of the fact that the tubular contact member 62 is in direct contact with the operating wire 67 and the latter in contact with the upper electrode 22, it is evident that by contacting the tubular contact member 62 with the ring shaped contact member 61, the electric circuit of lighting device 3 is closed and the lighting device operated. After taking the photograph, knob 68 is released and forced back into an inoperative position by the action of spring 64. Thus, this operating mechanism enables simultaneous sliding of the shutter along the camera surface and operation of the lighting device by a single downward movement of knob 68.

As illustrated in FIGS. 1 and 2, passing laterally through one wall of housing 56 so as to communicate with the bore 55 of tube 54 via resilient wire 67 is a nipple 44 of insulating material, this nipple receiving the end of a rubber tube 45 which is connected to automatic insufflator 47.

Automatic cavity inflator system 47 (shown in block form) utilizes a safe, low voltage current source such as a battery pack, to operate the compressor (not shown) and any other regulating and pumping apparatus required to inflate a bodily cavity at a safe rate and to a predetermined degree. An automatic inflation indicator 48 is in gaseous communication with tube 45 and system 47 to provide a visual indication of the air pressure in the cavity to be photographed. As shown in FIG. 4, a hole 40 equipped with a one way valve (not shown) is provided in disc cover 42 from bore 55 to permit air to be distributed into the cavity.

Recent advances have permitted the use of low current and/or voltage levels to actuate the filament 24 of lighting device 3. Previously, current of about 420 volts and 150 amperes was impressed to vaporize filament 24. However, by employing fast black and white or color slide or print film of ASA rating 100, 125, 200, 400, 1000 or greater, for example a lower degree of illumination can be utilized to provide clear and superbly defined photographs. Accordingly, a thinner refractory filament 24 can be employed requiring less current for safe operation.

In general, a power supply on the order of 250 volts to 350 volts and 2 milliamps is sufficient to activate the filament. Such a power supply can include at least one piezoelectric crystal 50 as shown in FIG. 1 or a self-contained battery pack mounted externally of the gastric camera and electrically connected to switch 51 mounted in housing 56.

As shown in FIG. 1, piezoelectric crystal(s) 50 is mounted in cap 52 locked onto housing 56. Crystal 50 is electrically connected to wire 67 and is actuated by the pressure of solenoid 53, which is in electrical contact with a safe, low-voltage power supply 73 conveniently housed in system 47. A firing button 74 activates solenoid 53. Solenoid 53, when actuated, is adapted to depress operating wire 67 and to close the contact of switch 51. Electrical contact is established with the filament 24 through electrode 22, operating wire 67, crystal 50, solenoid 53 and wire 72 by means of movable switch 51 in housing 56. Switch 51 is connected at one pole to wire 72 and at the other pole to solenoid 53 (when actuated). Operating wire 67 also moves the cameras 1 and 2 and light source 3 downwardly relative to shutter tube 34 to open the diaphragms on both the upper and lower cameras.

In operation, the camera apparatus is introduced into the cavity to be photographed, such as the stomach. The start button 76 is punched to initiate operation of the insufflator 47. After the desired air pressure is developed in the stomach as measured by indicator 48, pumping is arrested either by manual intervention, such as use of a stop button, or through an automatic system which meters the air pressure and signals the system 47 to cease operation upon reaching a satisfactory pressure level.

Thereafter, solenoid 53 is actuated to (i) close switch 51, (ii) to release stored energy from the piezoelectric source 50 and operate the flash device 3 and (iii) to simultaneously open the shutter to the diaphragms of the upper and lower cameras by depressing operating wire 67. When the solenoid is deactivated, the shutter is returned to its closed position and the switch contact opened to ready the crystal 50 for the next exposure.

In another embodiment similar to that shown in FIG. 1, plunger knob 68, when depressed, closes the contacts to switch 51 to fire the filament, while simultaneously operating wire 67 to move the cameras downwardly relative to the shutter tubes to thus open the diaphragms. In that embodiment wire 72 is connected to switch 51 directly, thereby dispensing with the contact members 61, 62 and their supports. An external battery pack connected to switch 51 via wire 84 provides the current for firing the filament. Switch 51 is also electrically connected to operating wire 67 through knob 68.

In order to permit films 17, 30 to be conveniently handled for sterilizing and developing operations, top and bottom film retainers 26 shown in FIG. 5 are provided on lower and upper camera spiders 15, 29. At the top portion of each spider face 16 are positioned a pair of opposed tabs 32, 32' extending in a transverse arc partially across a top cap 36 of each spider. At the bottom portion of each spider face a retaining bar 77 is positioned. In use, a film strip is inserted beneath the retaining bar 77 and under the tabs 32, 32' and abutting top cap 36 to lock the film against curved surface 16 of the spider. When all four film strips are inserted into a spider (as in a darkroom) the resulting loaded film cassette can be sterilized and mounted in the camera or sterilized and packaged for later use.

After exposure, the cassettes can be removed from the camera and developed without removing the individual film strips. To aid in removing the cassettes from the camera and in handling the cassettes during the sterilization and processing steps; a hanger 78, as illustrated in FIG. 6, is provided. The hanger consists of a platform 79 and a series of spaced apart, axially aligned threaded hanger posts 80 mounted in said platform. In order to accept the externally threaded posts, each lower camera spider 15 has an internally threaded bore 81 drilled therein adapted to be threaded onto a post 80. Each upper camera spider 29 also has on such an internally threaded bore (not shown) for receiving a threaded post 80. Several spiders, both lower and upper, are shown attached to hanger 78 in FIG. 6.

If desired, tube 54 can be adapted to accommodate a smaller diameter catheter. Such a catheter 86 (shown in FIG. 1) can be utilized by the physician or surgeon to introduce to a dye, a pH indicator or the like into the cavity to be photographed. If desired, a visual inspection of the cavity to be photographed can be conducted using an appropriate fiber optical assembly for such catheter. If desired, other surgical instruments or devices can be introduced into the cavity and the results of their use can be memorialized on film employing my invention.

I claim:

1. In an apparatus for photographing cavities of the body having a pair of tubular cameras, each containing a film-holding spider; a lighting element intermediate said cameras having a filament producing a glow discharge upon application of current; a tubular shutter slidably enclosing said cameras; means to move said cameras axially of said tubular shutter to permit exposure of said film in said spiders; and means to supply air to said apparatus and to expel air into a body cavity, the improvement comprising means for retaining said film in each of said spiders comprising:

an end cap for one end of said spider;
a pair of oppositely spaced anchor tabs extending partially axially of said spider from said end cap for holding one end of a film strip in said spider; and
a restraining bar spaced across the face of said spider at the other end of said spider for holding the other end of the film strip in said spider.

2. The apparatus of claim 1 including insufflator means for automatically supplying air to said camera apparatus and means detecting the pressure of air supplied to a body cavity.

3. The apparatus of claim 1 including an internally threaded orifice in each said film holding spider, said orifice adapted to receive a threaded post for supporting said spider.

4. The apparatus of claim 1 further comprising means for supplying a safe level of current to said lighting element, said means for supplying including:

a thin refractory filament for said lighting element actuated at low current and low voltage;
power supply means for supplying said low current and low voltage equivalent to about 250 volts and 2 milliamps and compatible with operating room safety, to said filament to discharge said filament; and
fast film responsive to illumination from the glow discharge of said filament.

* * * * *